May 20, 1958

J. M. REEVES ET AL 2,835,311

COMBINED BACK AND HEAD RESTS

Filed May 16, 1957

James M. Reeves
Iris K. Reeves
INVENTORS.

BY
Attorneys

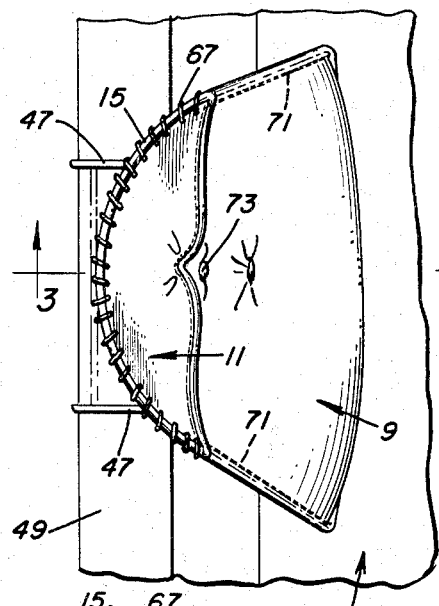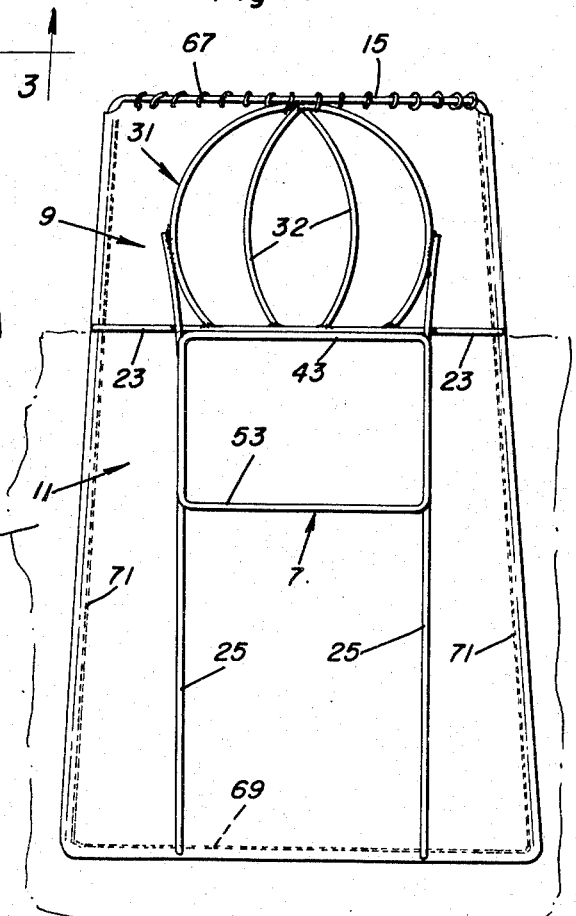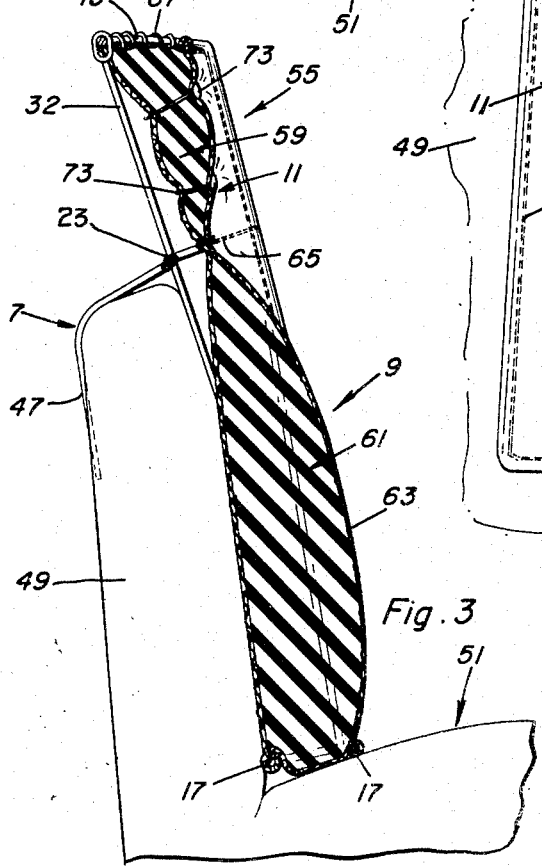

United States Patent Office 2,835,311
Patented May 20, 1958

2,835,311

COMBINED BACK AND HEAD RESTS

James M. Reeves and Iris K. Reeves, Charleston, Mo.

Application May 16, 1957, Serial No. 659,579

3 Claims. (Cl. 155—174)

Our invention relates to improvements in combined back and head rests for use in automobiles and the like.

The primary object of our invention is to provide a light weight yet strong back and head rest easily attached to the back of an automobile seat and by means of which a person may relax in a comfortable position with the head tilted backwardly in suitable position for resting the same or for sleeping.

Another object is to provide a back and head rest for the above purposes which will not damage the back of the seat and is of simple construction adapting the same for economical manufacture.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

Figure 2 is a fragmentary enlarged view in plan;

Figure 3 is a fragmentary enlarged view in vertical section partly in side elevation taken on the line 3—3 of Figure 2;

Figure 4 is an enlarged view in rear elevation with the back of the seat in broken lines.

Figures 1, 5:
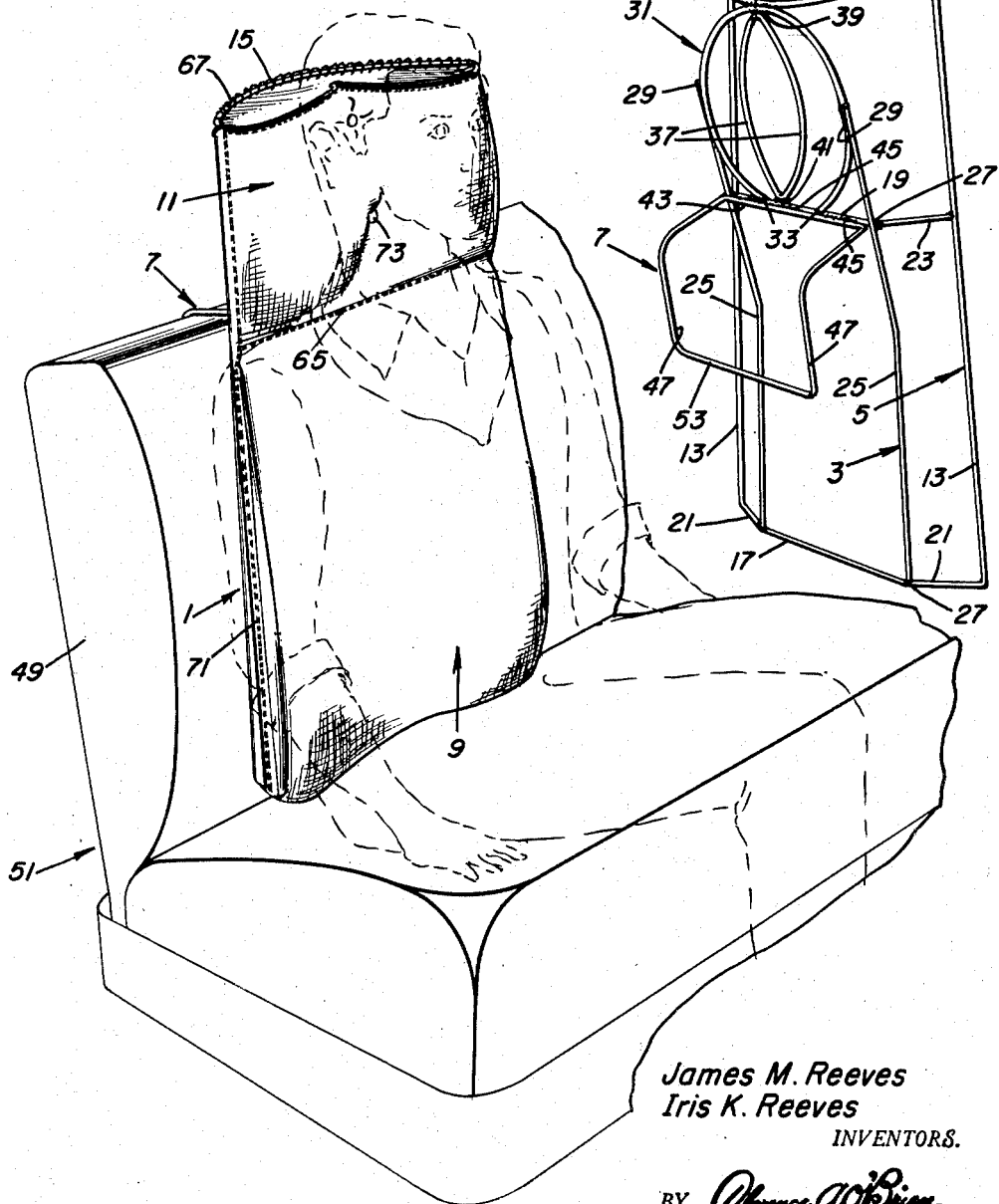
Figure 1 is a perspective view of our improved back and head rest attached to the back of an automobile seat.
Figure 5 is a fragmentary view in perspective of the back and head rest frame.

Referring to the drawings by numerals our back and head rest designated generally by the numeral 1 comprises a main frame 3, a sub-frame 5, an attaching hanger frame 7, and back and head rest cushions 9, 11.

The main frame 1 is of vertically elongated, generally rectangular shape, formed of comparatively stiff wire and includes a pair of upwardly converging upright side members 13, transverse top and bottom members 15, 17 and an intermediate transverse member 19 between the transverse center of the frame 1 and the top member. The top member 15 is bowed rearwardly and the bottom and intermediate members 17, 19, bent rearwardly to provide inwardly and rearwardly inclined end portions 21, 23 therein and whereby the main frame is generally concave.

The sub-frame 3 comprises a pair of upright side members 25 secured to the bottom and intermediate members 21, 23 as by welding 27 and which are spaced in the main frame 1 rearwardly from the side members 13 by the end portions 21, 23 and are bent forwardly intermediate their ends to incline upwardly and rearwardly above the transverse intermediate member 23 and terminate intermediate said member 23 and the top member 15 of the main frame 1 in welded attachment, as at 29, to opposite sides of a wire reinforcing upright C-shaped member 31 terminally welded, as as 33, to the intermediate member 23 and welded, as at 36, at its center to the center of the top member 15 in upwardly and rearwardly inclined position.

The C-shaped member 31 straddles a pair of oppositely bowed reinforcing upright wire members 37 coplanar with said member 31 and terminally welded, as at 39, to the central portion of the C-member 31, and as at 41, to the intermediate member 23 of the main frame 1.

The hanger frame 7 also of wire comprises a transverse top member 43 extending horizontally along the intermediate member between the ends 23 of the latter and welded, as at 45, to said intermediate member 23, at the back of the frame. The frame 7 further includes a pair of rearwardly and downwardly extending side members 47 bent intermediate their ends, to hook over the top of the back 49 of an automobile seat 51, and a bottom horizontal transverse member 53 connecting the members 47. As will be seen the hanger frame 7 is substantially a skeleton hook.

The back and head rest cushions 9, 11 comprise a substantially rectangular head rest pad 59 of sponge rubber between the top and intermediate members 15, 23 of the main frame 1, and a subjacent longer back rest pad 61 also of sponge rubber and of oblong rectangular shape and extending substantially from the intermediate member 23 to the bottom member 17 of the main frame, both of the cushions being enclosed in an upholstery cover 63 sewed together as at 65 between said pads 59, 61 to separate the same and forming therewith a rectangular oblong cushion unit fitting in the main frame 1 and suitably sewed to the top and bottom members 15, 17 as at 67, 69 and to the side members 13 as at 71.

The operation and use of our invention will be readily understood. The hanger frame 7 is hooked over the back 49 of the seat 51 to attach the combined back and head rest and when it is so attached the side members 25 of the sub-frame 3 rest against the seat back 49 and the main frame 1 and sub-frame above the hanger frame project above the seat back to hold the head rest cushion 11 above said back 49 while the back rest cushion 9 is supported in front of the back 49. A person reclining against the back rest cushion 9 causes said cushion 57 to curve rearward between the side members 13 of the main frame 1 which, since they extend forwardly of the sub-frame 3 serve to hold a person upright between said side members 13. The person may incline his or her head backwardly against the head rest cushion 11 which is backed by the C-member 31 and wire members 37 which together form an open grill providing an upwardly and rearwardly inclined back for the head rest cushion 11. The head rest cushion 55 may be tufted as represented at 73.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combined back and head rest comprising a main frame including a pair of upright side members, and upper and lower end members and an intermediate member cross connecting the side members, a sub-frame including upright side members between the first side members connected to the lower end and intermediate members of the main frame and including an upright grill connected to said upper and intermediate members, said upper, lower and intermediate members spacing the side members of the main frame forwardly and outwardly of the side members of the sub-frame, a hooked hanger frame attached to the intermediate member for hooking over the back of an automobile seat to suspend said frames in a position to extend above said back, and a cushion unit attached to said main frame and backed by said sub-frame.

2. The combination of claim 1, said sub-frame inclining upwardly and rearwardly relative to the side members of the main frame to support the cushion unit above said back in a rearwardly and upwardly inclined position.

3. The combination of claim 1, said upper end member being curved and said lower end member and the intermediate member having inclined ends spacing the side members of the main frame forwardly of the sub-frame.

References Cited in the file of this patent

UNITED STATES PATENTS

| | | |
|---|---|---|
| 471,049 | Barth | Mar. 15, 1892 |
| 2,260,352 | Trapani | Oct. 28, 1941 |
| 2,756,808 | Eichorst | July 31, 1956 |